US012794081B2

(12) United States Patent
Seok et al.

(10) Patent No.: US 12,794,081 B2
(45) Date of Patent: Nov. 10, 2026

(54) ELECTRODE ASSEMBLY AND RECHARGEABLE BATTERY INCLUDING SAME

(71) Applicant: Samsung SDI Co., Ltd., Yongin-si (KR)

(72) Inventors: Hoon Seok, Yongin-si (KR); Junghyun Nam, Yongin-si (KR); Heeeun Yoo, Yongin-si (KR); Yeonhee Yoon, Yongin-si (KR); Kyuseo Lee, Yongin-si (KR); Bokkyu Jeon, Yongin-si (KR); Jaehwan Ha, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1010 days.

(21) Appl. No.: 16/981,261

(22) PCT Filed: Mar. 5, 2019

(86) PCT No.: PCT/KR2019/002526
§ 371 (c)(1),
(2) Date: Sep. 15, 2020

(87) PCT Pub. No.: WO2019/177296
PCT Pub. Date: Sep. 19, 2019

(65) Prior Publication Data

US 2021/0057702 A1 Feb. 25, 2021

(30) Foreign Application Priority Data

Mar. 15, 2018 (KR) ........................ 10-2018-0030286

(51) Int. Cl.
*H01M 50/44* (2021.01)
*H01M 10/05* (2010.01)
(Continued)

(52) U.S. Cl.
CPC ..... *H01M 50/449* (2021.01); *H01M 10/0525* (2013.01); *H01M 50/409* (2021.01);
(Continued)

(58) Field of Classification Search
None
See application file for complete search history.

(56) References Cited

U.S. PATENT DOCUMENTS 10,734,627 B2 * 8/2020 Shin ...................... H01M 50/42
2012/0301777 A1 11/2012 Ahn
(Continued)

FOREIGN PATENT DOCUMENTS

CN 104377328 A 2/2015
CN 104638216 A 5/2015
(Continued)

OTHER PUBLICATIONS

Extended European Search Report dated Nov. 25, 2021, issued to European Patent Application No. 19767622.
(Continued)

*Primary Examiner* — Barbara L Gilliam
*Assistant Examiner* — Angela J Martin
(74) *Attorney, Agent, or Firm* — Womble Bond Dickinson (US) LLP

(57) ABSTRACT

The present invention relates to an electrode assembly and a rechargeable battery including same. The electrode assembly may comprise: a negative electrode, a positive electrode, and a separator interposed between the negative electrode and the positive electrode and including a first surface facing the negative electrode and a second surface facing the positive electrode, a first functional layer positioned on the first surface and including a fibrous polymer and a heat
(Continued)

resistant polymer, and a second functional layer positioned on the second surface and including an inorganic particle and an organic particle.

16 Claims, 6 Drawing Sheets

(51) Int. Cl.

| | |
|---|---|
| ***H01M 10/0525*** | (2010.01) |
| ***H01M 50/40*** | (2021.01) |
| ***H01M 50/409*** | (2021.01) |
| ***H01M 50/411*** | (2021.01) |
| ***H01M 50/443*** | (2021.01) |
| ***H01M 50/446*** | (2021.01) |
| ***H01M 50/449*** | (2021.01) |
| ***H01M 50/46*** | (2021.01) |
| ***H01M 50/48*** | (2021.01) |
| *H01M 50/489* | (2021.01) |

(52) U.S. Cl.

CPC ......... *H01M 50/411* (2021.01); *H01M 50/44* (2021.01); *H01M 50/443* (2021.01); *H01M 50/446* (2021.01); *H01M 50/46* (2021.01); *H01M 50/489* (2021.01)

(56) References Cited

U.S. PATENT DOCUMENTS

2013/0101886 A1* 4/2013 Jung .................. H01M 50/426
429/231.95
2015/0050544 A1 2/2015 Nam et al.
2015/0125736 A1 5/2015 Kim et al.
2015/0249243 A1 9/2015 Nagino et al.
2017/0309915 A1 10/2017 Lee et al.
2017/0324097 A1 11/2017 Lee et al.
2018/0294461 A1* 10/2018 Feng .................. H01M 50/417
2018/0309108 A1 10/2018 Shin et al.
2020/0014027 A1 1/2020 Ha et al.
2020/0194784 A1 6/2020 Lee et al.
2020/0350557 A1 11/2020 Ha et al.
2020/0350566 A1 11/2020 Ha et al.
2020/0350567 A1 11/2020 Ha et al.
2020/0350568 A1 11/2020 Lee et al.
2020/0350574 A1 11/2020 Ha et al.
2020/0350580 A1 11/2020 Ha et al.
2020/0350632 A1 11/2020 Ha et al.
2020/0411844 A1 12/2020 Oh et al.

FOREIGN PATENT DOCUMENTS

CN 106898718 A 6/2017
JP 2003-045477 * 2/2003 ............ H01M 10/28
KR 10-2013-0103404 9/2013
KR 10-2015-0019991 2/2015
KR 10-2016-0069493 6/2016
KR 10-2016-0097537 8/2016
KR 10-2017-0126404 11/2017
WO 2017-101819 6/2017
WO 2017-171524 10/2017

OTHER PUBLICATIONS

ISR for PCT/KR2019/002526 published Jun. 2019.
Chinese Office Action dated Dec. 18, 2023, including Search Report dated Dec. 14, 2023, for corresponding Application No. 201980019369.8, including English translation, 21 pages.

* cited by examiner

ELECTRODE ASSEMBLY AND RECHARGEABLE BATTERY INCLUDING SAME

CROSS REFERENCE TO RELATED APPLICATION

This application is a National Stage Entry of International Patent Application No. PCT/KR2019/002526, filed on Mar. 5, 2019, and claims priority from and the benefit of Korean Patent Application No. 10-2018-0030286, filed on Mar. 15, 2018, each of which is incorporated by reference for all purposes as if fully set forth herein.

BACKGROUND

Field

The disclosure relates to an electrode assembly and a rechargeable battery including the same.

Discussion of the Background

A portable information device such as a cell phone, a laptop, smart phone, and the like or an electric vehicle has used a rechargeable lithium battery having high energy density and easy portability as a driving power source. Furthermore, research on use of a rechargeable lithium battery as a power source for a hybrid or electric vehicle or a power storage unit by using high energy density characteristics has recently been actively made.

One of the main research tasks on the rechargeable lithium battery applied to a vehicle and the like is to improve safety of the battery. For example, when heat of the rechargeable lithium battery is generated due to a short circuit at the inside thereof, overcharge and overdischarge, etc., and thus a decomposition reaction of an electrolyte and thermal runaway occur, an inside pressure of the battery may be abruptly increased to cause an explosion of the battery. Among these, the occurrence of a short circuit at the inside of the rechargeable lithium battery is the most dangerous, as the high electrical energy stored in each of the positive electrode and the negative electrode at which the short circuit occurs, is rapidly conducted.

Such an explosion may break the rechargeable lithium battery as well as cause fatal damage to users, so that urgent development related to the technology for improving safety of the rechargeable lithium battery is required.

SUMMARY

Additional features of the inventive concepts will be set forth in the description which follows, and in part will be apparent from the description, or may be learned by practice of the inventive concepts.

Electrode assembly and rechargeable battery including the same constructed according to exemplary embodiments of the invention are capable of having improved resistance characteristics, improved safety, and simultaneously secure excellent resistance characteristic.

An electrode assembly according to one exemplary embodiment may include: a negative electrode; a positive electrode; a separator interposed between the negative electrode and the positive electrode and including a first surface facing the negative electrode and a second surface facing the positive electrode; a first functional layer positioned on the first surface and including a fibrous polymer and a heat resistant polymer; and a second functional layer positioned on the second surface and including an inorganic particle and an organic particle.

A rechargeable battery according to one exemplary embodiment may include the electrode assembly and an outer case housing the electrode assembly.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
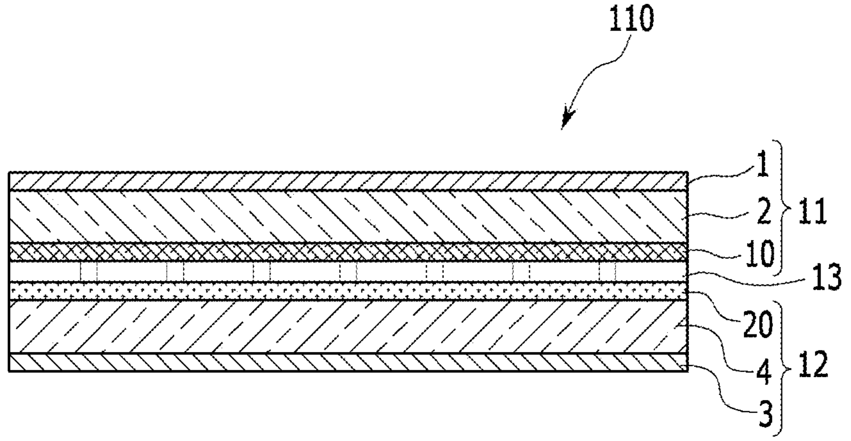
FIG. 1 is a cross-sectional view schematically showing the electrode assembly according to an exemplary embodiment of the invention.

FIG. 1 exemplifies a cross-section of the electrode assembly according to one exemplary embodiment.

Referring to FIG. 1, the electrode assembly according to one exemplary embodiment includes a negative electrode 11, a positive electrode 12, a separator 13, a first functional layer 10, and a second functional layer 20.

The separator 13 is interposed between the negative electrode 11 and the positive electrode 12, and includes a first surface facing the negative electrode 11 and a second surface facing the positive electrode 12.

The separator 13 may separate the positive electrode 11 and the negative electrode 12 and provide a transporting passage for lithium ions, and one having low resistance to ion transport and excellent impregnation for an electrolyte may be used as the separator 13.

The separator 13 may be, for example, a substrate which is at least one selected from polyethylene, polypropylene, polybutylene, polypentene, polytetrafluoroethylene, polyester, polyacetal, polyamide, polycarbonate, polyimide, polyetherimide, polyvinylidene fluoride, polyetheretherketone, polyethersulfone, polyphenylene oxide, polyphenylene sulfide, polyethylene naphthalene, and so on.

In addition, the separator 13 may be a coated substrate formed by coating a composition including polymer materials or ceramic components on a substrate in order to secure heat resistance or mechanical strength.

The separator 13 may selectively have a single-layer or multi-layer structure.

The first functional layer 10 is positioned on the first surface of the separator 13 facing the negative electrode 11.

A thickness of the first functional layer 10 may be 1 μm to 12 μm. More specifically, the thickness of the first functional layer 10 may be 2 μm to 6 μm or 3 μm to 4 μm.

When the thickness of the first functional layer is within the range, it may have a flexible characteristic, and thus a separation of the first functional layer rarely occurs.

Furthermore, tortuosity is low, and thus the interface resistance is low, so that it has the advantage of improving performance of the rechargeable lithium battery.

The first functional layer 10 may be, for example, formed by using crosslink spinning or co-spinning, and at this time, the first functional layer 10 formed by the procedure may have a network structure. Herein, the network structure indicates a structure in which single fibrous phase forms an irregular net structure to have many empty spaces inside.

Accordingly, the first functional layer 10 may have permeability in the range of 60% to 80%.

In some exemplary embodiments, the permeability is expressed by measuring time for passing the first functional layer after 100 cc of air is injected into the first functional layer. Accordingly, as the value of permeability is low, the empty spaces are largely positioned in the first functional layer, so the time for passing 100 cc of air into the first functional layer is short. For example, in the case of the permeability of the first functional layer 10 being 50%, the time for passing 100 cc of air is 100 seconds to 130 seconds, but in the case of the permeability of the first functional layer 10 being 60% to 80%, the time for passing 100 cc of air is 20 seconds to 70 seconds.

In some exemplary embodiments, the first functional layer 10 may be prepared by using electrospinning.

Electrospinning is a method for preparing a layer by discharging an electrically charged polymer solution in a form of a fiber via a jet. Therefore, the first functional layer 10 prepared by the electrospinning includes a three-dimensional network mesh form, as fibers with diameter of hundreds of nm to tens of μm are randomly, that is, irregularly, laminated. Accordingly, the first functional layer 10 is a very porous structure layer.

Furthermore, the first functional layer 10 includes a fibrous polymer and a heat resistant polymer.

The fibrous polymer acts as a binder in the network structure and may be a polymer with a low polymerization degree.

Specifically, the fibrous polymer has a relatively low melting point, because of the low polymerization degree. Therefore, the fibrous polymer acts as a binder to improve adherence between the first functional layer and the negative electrode. Furthermore, it may strengthen the adhesion of the fibers to each other in the first functional layer.

The fibrous polymer may include, for example, at least one selected from polyethylene (PE), polypropylene (PP), polymethylmethacrylate (PMMA), polyvinylidene fluoride (PVdF), polyvinyl pyrrolidone (PVP), polysulfone (PSF), polystyrene (PS), polyvinyl chloride (PVC), and polyethylene terephthalate (PET).

Meanwhile, the heat resistant polymer may be a polymer exhibiting excellent heat resistance. Thus, it may not melt at high temperatures and acts as a structure supporter for maintaining the first functional layer. In addition, it may prevent shrinkage due to the melting of polyethylene which is generally used as a separator material, together with the maintaining of the structure of the first functional layer itself.

The heat resistant polymer may be, for example, at least one selected from polyimide (PI), polyetherimide (PEI), polyvinyl alcohol (PVA), polyacrylonitrile (PAN), polytetrafluoroethylene (PTFE), polyamide-imide (PAI), polyetheretherketone (PEEK), polyether sulfone (PES), and polyphenylene sulfide (PPS).

A mixing weight ratio of the fibrous polymer and the heat resistant polymer may be in the range of 5:5 to 2:8. More specifically, the mixing weight ratio of the fibrous polymer and the heat resistant polymer may be in the range of 4:6 to 2:8. When the mixing weight ratio of the heat resistant polymer is less than 5, beads may be generated in the first functional layer to deteriorate heat resistance. Furthermore, when the mixing weight ratio of the heat resistant polymer is more than 8, two types of fibrous phases are mixed in the first functional layer to make the first functional layer non-uniform, thereby deteriorating quality.

That is, in some exemplary embodiments, when the mixing weight ratio of the fibrous polymer and the heat resistant polymer satisfies the above range, the stable network structure having the two polymers in the form of the single phase may be prepared.

As described above, the first functional layer 10 prepared by mixing the fibrous polymer and the heat resistant polymer in the above range includes a network structure including the single fiber, even though it includes two polymers. Herein, the single fiber may have an average diameter of 900 nm to 1.7 μm.

Next, the second functional layer 20 is positioned on the second surface of the separator 13 facing the positive electrode 12.

A thickness of the second functional layer 20 may be 2 μm to 15 μm. More specifically, the thickness of the second functional layer 20 may be 3 μm to 10 μm, or 6 μm to 8 μm.

When the second functional layer having excellent thermal stability is included in the thickness range, the side reaction site of the surface of the positive electrode is decreased, thereby abruptly decreasing the gas generation. Furthermore, the shut-down function is enhanced, and thus the safety of the battery may be also improved.

The second functional layer 20 may be prepared, for example, by a technique such as gravure coating, die coating, comma coating, shutter coating, etc.

In addition, the second functional layer 20 includes inorganic particles and organic particles.

The inorganic particles may be, for example, at least one selected from a lithium manganese-based oxide and a lithium iron phosphate-based oxide. As the second functional layer 20 includes inorganic particles, the electrode assembly having excellent thermal stability may be realized.

Herein, the lithium manganese-based oxide may be, for example, $LiMn_2O_4$, and the lithium iron phosphate-based oxide may be, for example, $LiFePO_4$.

Meanwhile, the inorganic particles may have an average particle diameter of 2 μm to 5 μm.

When the average particle diameter of the inorganic particles is within the above range, the conductivity of the positive electrode is not deteriorated and the rechargeable lithium battery exhibiting electrochemical characteristics may be realized.

As the organic particles, organic fillers with a melting point of, for example, around 100° C. may be used without any limitation. Specifically, the organic particles may include, for example, polyethylene wax.

The polyethylene wax may enhance shut-down characteristics in which the separator included in the electrode assembly is melted around 100° C. to block pores. Thus, the reaction may be stopped in the electrode assembly, so that the thermal runaway of the battery may be prevented, thereby improving the safety.

Furthermore, the organic particles may have an average particle diameter of 0.5 μm to 2 μm. When the average particle diameter of the organic particles is within the range, they may be readily inserted into pores of the inorganic particles, and give excellent shut-down effects in case of melting of the organic particles due to an increase in temperature of the electrode assembly.

With reference to the total second functional layer 20, an amount of the organic particles may be 5 wt % to 60 wt %, and more specifically, 10 wt % to 55 wt %, 30 wt % to 55 wt %, or 40 wt % to 50 wt %. When the amount of the organic particles in the second functional layer 20 is within the above range, it may enhance the shut-down function, which is very advantageous in terms of safety of the rechargeable lithium battery using the same according to some exemplary embodiments.

Herein, the amount of the organic particles in the second functional layer 20 is based on an amount of the solid included in the second functional layer which is converted to be 100%.

The second functional layer may include a first binder in addition to inorganic particles and organic particles.

Herein, the second functional layer may include 92 wt % to 98 wt % of the mixture of the inorganic particles and the organic particles and 2 wt % to 8 wt % of the first binder with reference to the total second functional layer.

As the first binder, for example, an acrylate-based binder may be used, and at least one selected from polyvinylidene fluoride (PVdF), polyvinyl pyrrolidone (PVP), polysulfone (PSF), polystyrene (PS), and polyvinyl chloride (PVC) may be further used. The first binder may act to well adhere the inorganic particles and the organic particles to each other and to well bind the second functional layer 20 to the positive electrode 12.

As one exemplary embodiment, when the electrode assembly includes the above-described first and second functional layers, the shut-down function of the rechargeable battery using the electrode assembly according to one exemplary embodiment may be further enhanced, so that the heat generation of the rechargeable battery may be initially inhibited and the thermal safety may be further improved.

Meanwhile, the negative electrode 11 may include a structure in which a negative current collector layer 1 and a negative active material layer 2 are stacked.

The negative current collector layer 1 may include, for example, a copper foil, a nickel foil, a stainless steel foil, a titanium foil, a nickel foam, a copper foam, a polymer substrate coated with a conductive metal, or a combination thereof, but is not limited thereto.

The negative active material layer may be positioned on at least one side of the negative current collector layer 1. The negative active material layer 2 may be prepared using a negative slurry including a negative active material and a negative conductive material.

The negative active material may include carbon-based materials which easily intercalate and deintercalate lithium ions to realize excellent high-rate charge and discharge characteristics.

The carbon-based material may be crystalline carbon or amorphous carbon.

Examples of the crystalline carbon may be graphite, etc.

Examples of the amorphous carbon may be soft carbon (low temperature sintered carbon) or hard carbon, mesophase pitch carbide, and sintered cokes. As one example, the carbon-based material may be soft carbon.

The soft carbon may be graphitizable carbon, and indicates carbon of which atoms are arranged in order to easily make a layered structure so that the heat-treatment temperature is increased to s easily convert it into a graphite structure. The soft carbon has more disordered crystallite than graphite, so that gates for helping entry of ions are large and a lower degree of disordered crystal than hard carbon, thereby easily diffusing ions. A specific example of the carbon-based material may be low-crystalline soft carbon.

Meanwhile, the amount of the negative active material is not specifically limited, but the amount may be 70 wt % to 99 wt %, and more specifically, 80 wt % to 98 wt %, with the reference to the total weight of the negative slurry.

The crystalline carbon may have various shapes such as spherical, sheet-shaped, flake, or fiber-shaped, and for example, a needle shape.

Meanwhile, the negative slurry may include a negative conductive material.

The negative conductive material is included to provide electrode conductivity, and any electrically conductive material may be used as a conductive material unless it causes a chemical change in a battery. The examples of the conductive material include a carbon-based material such as natural graphite, artificial graphite, carbon black, acetylene black, a carbon black sold under the trade designation KETJENBLACK, a carbon fiber, and the like; a metal-based material of a metal powder or a metal fiber including copper, nickel, aluminum, silver, and the like; a conductive polymer such as a polyphenylene derivative; or a mixture thereof.

The amount of the negative conductive material may be 1.5 wt % to 30 wt %, and more specifically, 1 wt % to 25 wt %, or 2 wt % to 20 wt %, with reference to the total weight of the negative slurry. However, the amount of the negative conductive material may be suitably controlled according to the types and the amount of the negative active material.

In the disclosure, the negative slurry may preferably include a negative active material at 70 wt % to 98 wt %, and the negative conductive material at 1.5 wt % to 30 wt % based on the total weight of the negative slurry.

If necessary, the negative slurry may further include a binder.

The binder serves to adhere the negative active material particles to each other and to adhere the negative active material to a current collector. The binder may be, for example, polyvinyl alcohol, carboxymethyl cellulose, hydroxypropyl cellulose, polyvinyl chloride, carboxylated polyvinyl chloride, polyvinylfluoride, an ethylene oxide-containing polymer, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like, but is not limited thereto.

Next, the positive electrode 12 includes a positive current collector layer 3 and a positive active material layer 4 positioned at least one side of the positive current collector layer 3.

The current collector of the positive current collector layer 3 may be, for example, an aluminum foil, a nickel foil, or a combination thereof, but is not limited thereto.

In the positive active material layer 4, an amount of the positive active material may be 90 wt % to 98 wt % or 90 wt % to 96 wt % based on the total weight of the positive active material layer.

The positive active material layer may further include a binder and a conductive material. Herein, an amount of the binder may be 1 wt % to 5 wt % or 1 wt % to 2 wt % based on the total weight of the positive active material layer. An amount of the conductive material may be 1 wt % to 5 wt % or 1 wt % to 2 wt % based on the total weight of the positive active material layer.

The binder serves to well adhere the positive active material particles each other and to well adhere the positive active material to the current collector. Exemplary of the binder may be polyvinyl alcohol, carboxymethyl cellulose, hydroxypropyl cellulose, diacetylcellulose, polyvinyl chloride, carboxylated polyvinyl chloride, polyvinylfluoride, an ethylene oxide-containing polymer, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like, but is not limited thereto.

The conductive material is included to provide electrode conductivity, and any electrically conductive material may be used as a conductive material unless it causes a chemical change in a battery. Examples of the conductive material include a carbon-based material such as natural graphite, artificial graphite, carbon black, acetylene black, a carbon black sold under the trade designation KETJENBLACK, a carbon fiber, and the like; a metal-based material of a metal powder or a metal fiber including copper, nickel, aluminum, silver, and the like; a conductive polymer such as a polyphenylene derivative; or a mixture thereof.

Figure 2:
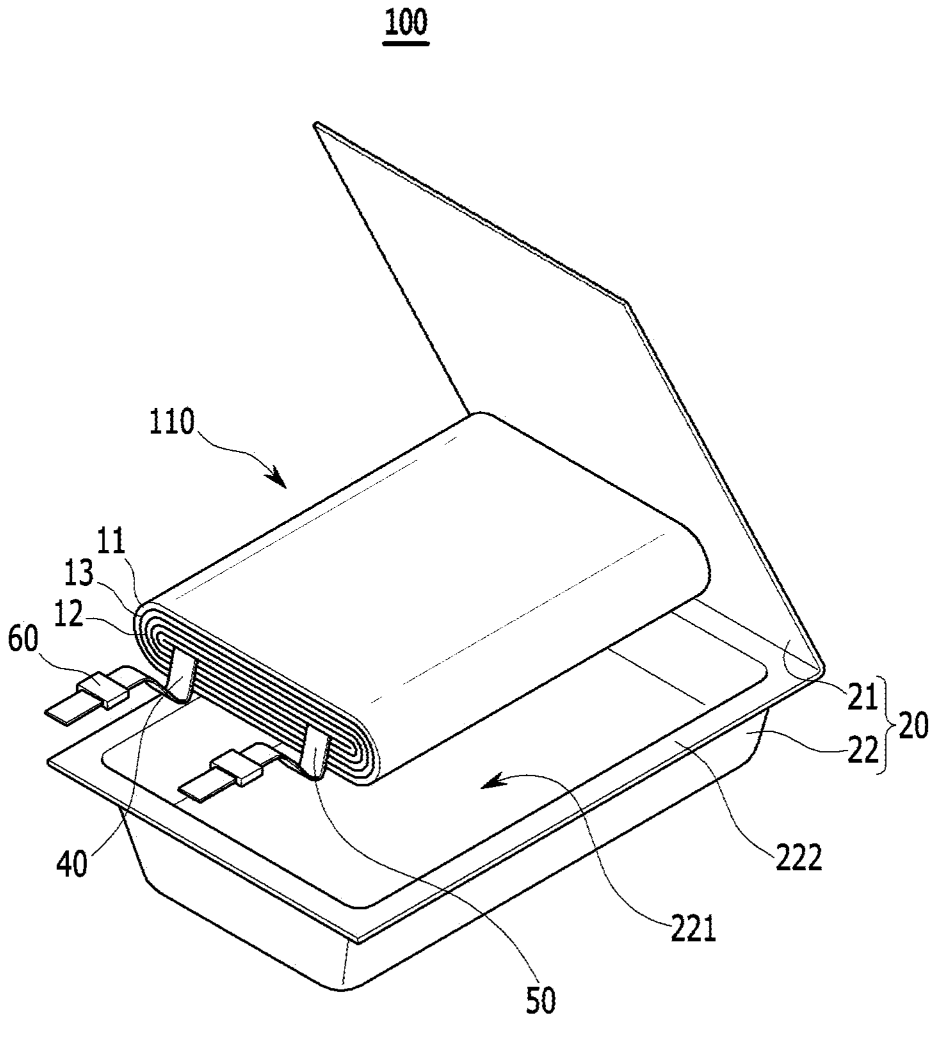
FIG. 2 is a perspective view of a rechargeable lithium battery according to an exemplary embodiment of the invention.

FIG. 2 schematically shows a rechargeable battery according to one exemplary embodiment.

Referring to FIG. 2, the rechargeable lithium battery 100 includes an electrode assembly 110, an outer case 20 housing the electrode assembly 110, and a positive terminal 40 and a negative terminal 50 which are electrically connected to the electrode assembly 110.

The electrode assembly 110 may include a negative electrode 11, a positive electrode 12, a separator 13 interposed between the negative electrode 11 and the positive electrode 12, and an electrolyte solution (not shown) impregnated into the negative electrode 11, the positive electrode 12 and the separator 13.

The electrode assembly 110 may be the electrode assembly according to one exemplary embodiment.

Thus, the negative electrode 11, the positive electrode 12, and the separator 13 are the same as described above, and they are not described therewith, hereinafter.

Meanwhile, the electrode assembly 110 may be a flat structure by interposing the separator 13 between the negative electrode 11 and the positive electrode 12, winding, and pressurizing, as shown in FIG. 2. Or, although not shown, it may be stacked structure in which a plurality of the square-type positive and negative electrodes are alternately stacked with a separator therebetween.

Furthermore, the positive electrode 11, the negative electrode 12, and the separator 13 may be impregnated with the electrolyte solution.

The electrolyte solution includes a non-aqueous organic solvent and a lithium salt.

The non-aqueous organic solvent serves as a medium for transmitting ions taking part in the electrochemical reaction of a battery.

The non-aqueous organic solvent may include a carbonate-based, an ester-based, an ether-based, a ketone-based, an alcohol-based, or an aprotic solvent.

The carbonate-based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may be methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. Furthermore, the alcohol-based solvent may be ethanol, isopropyl alcohol, and the like, and the aprotic solvent may be nitriles such as R—CN (wherein R is a $C_2$ to $C_{20}$ linear, branched, or cyclic hydrocarbon group, or may include a double bond aromatic ring, or an ether bond), amides such as dimethyl formamide, and the like, dioxolanes such as 1,3-dioxolane, and the like, and sulfolanes, and the like.

The organic solvent may be used alone or in a mixture, and when the organic solvent is used in a mixture, a mixture ratio may be controlled in accordance with a desirable battery performance, which may be understood by a person having ordinary skill in this art.

In addition, the carbonate-based solvent may include a mixture of a cyclic carbonate and a linear (chain) carbonate.

In this case, when the cyclic carbonate and the linear carbonate are mixed together in a volume ratio of 1:1 to 1:9, performance of an electrolyte solution may be enhanced.

The organic solvent of the disclosure may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 1.

[Chemical formula 1]

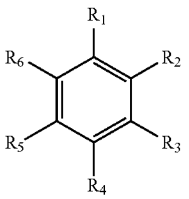

In Chemical Formula 1, $R_1$ to $R_6$ are the same or different and are selected from the group consisting of hydrogen, a halogen, a $C_1$ to $C_{10}$ alkyl group, a haloalkyl group, and a combination thereof.

Specific examples of the aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate or an ethylene carbonate-based compound of Chemical Formula 2 in order to improve cycle-life of a battery.

[Chemical formula 2]

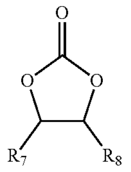

In Chemical Formula 2, $R_7$ and $R_8$ are the same or different and are selected from hydrogen, a halogen, a cyano group (CN), a nitro group ($NO_2$), and a fluorinated $C_1$ to $C_5$ alkyl group, provided that at least one of $R_7$ and $R_8$ is selected from a halogen, a cyano group (CN), a nitro group ($NO_2$), and a fluorinated $C_1$ to $C_5$ alkyl group, and $R_7$ and $R_8$ are not simultaneously hydrogen.

Examples of the ethylene carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in an organic solvent supplies a battery with lithium ions, basically operates the lithium secondary battery, and improves transportation of the lithium ions between a positive electrode and a negative electrode. Examples of the lithium salt include one, or two or more, selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, for example an integer ranging from 1 to 20), LiCl, LiI, and $LiB(C_2O_4)_2$ (lithium bis(oxalato) borate: LiBOB), as a supporting salt. A concentration of the lithium salt may range from 0.1 M to 2.0 M. When the lithium salt is included at the above concentration range, an electrolyte may have excellent performance and effective lithium ion mobility due to optimal electrolyte conductivity and viscosity.

Meanwhile, the separator 13 interposed between the positive electrode 11 and the negative electrode 12 may be a polymer film. The separator may be, for example, polyethylene, polypropylene, polyvinylidene fluoride, or multi-layers thereof having two or more layers, and may be a mixed multilayer such as a polyethylene/polypropylene double-layered separator, a polyethylene/polypropylene/polyethylene triple-layered separator, a polypropylene/polyethylene/polypropylene triple-layered separator, and the like.

The outer case 20 may include a lower outer case 22 and an upper outer case 21 and the electrode assembly 110 is housed in an inner space 221 of the lower outer case 22.

After the electrode assembly 110 is housed in the outer case 20, a sealing material is coated on a sealing portion 222 positioned on an edge of the lower outer case 22 to seal the upper outer case 21 and the lower outer case 22. Herein, a portion contacted with the positive terminal 40 and the negative terminal 50 is covered with an insulation member 60 to improve durability of the rechargeable lithium battery 100.

Meanwhile, the rechargeable battery according to one exemplary embodiment may be applied to a device including at least one thereof. Such a device may be, for example, at least one selected from a mobile phone, a tablet computer, a laptop computer, a power tool, a wearable electronic device, an electric vehicle, a hybrid electric vehicle, a plug-in hybrid electric vehicle, and a power storage device.

The devices applied with the rechargeable lithium battery are well known in the related arts, and thus are not described in detail the exemplary embodiments.

EXAMPLES

Hereinafter, examples of the exemplary embodiments and comparative examples are described. These examples, however, are not in any sense to be interpreted as limiting the exemplary embodiments.

Example 1

(1) Preparation of a Negative Electrode and First Functional Layer 98 wt % of graphite, 0.8 wt % of carboxymethyl cellulose, and 1.2 wt % of styrene-butadiene rubber were mixed in pure water to prepare a negative active material slurry. The negative active material slurry was coated on a copper foil, dried, and compressed to prepare a negative electrode with a thickness of 146 μm±4 μm.

Polyimide (PI) and polyvinylidene fluoride (PVdF) were mixed at a weight ratio of 5:5 and simultaneously electrospun on the negative electrode to prepare a first functional layer with a thickness of 7 μm.

(2) Preparation of a Positive Electrode and a Second Functional Layer 96 wt % of a mixture of a $LiNi_{0.6}Co_{0.2}Mn_{0.2}O_2$ first positive active material and a $LiNi_{0.6}Co_{0.2}Al_{0.2}O_2$ second active material at a weight ratio of 80:20 (first positive active material:second positive active material), 2 wt % of a carbon black sold under the trade designation Denka Black® by Denka Company Limited of Tokyo, Japan, hereinafter “denka black,” and 2 wt % of polyvinylidene fluoride was mixed in an N-methyl pyrrolidone solvent to prepare a positive active material slurry.

The positive active material slurry was coated on an aluminum foil current collector and dried. Thereafter, the dried product was compressed to prepare a positive active material with a thickness of 152 μm±4 μm thereby preparing a positive electrode.

96 wt % of a mixture of $LiMn_2O_4$ with an average a particle diameter of 4 μm and a polyethylene wax with an average particle diameter of 1 μm at a weight ratio of 5:5 and 4 wt % of an acryl-based binder was mixed to prepare a second functional layer composition.

The second functional layer composition was coated on the positive electrode to prepare a second functional layer with a thickness of 3.5

(3) Preparation of Rechargeable Lithium Cell

The negative electrode, the first functional layer, a separator, the second functional layer, and the positive electrode were sequentially stacked, and a rechargeable lithium cell was fabricated using an electrolyte in accordance with the general procedure.

Herein, as the electrolyte, a mixed solvent of ethylene carbonate and dimethyl carbonate (50:50 volume ratio) in which 1.0 M $LiPF_6$ was dissolved, was used.

Example 2

A negative electrode, a first functional layer, a positive electrode, a second functional layer, and a rechargeable lithium cell were fabricated by the same procedure as in Example 1, except that the mixing ratio of polyimide and polyvinylidene fluoride (PVdF) was 7:3 in the first functional layer preparation.

Comparative Example 1

A negative electrode, a first functional layer, a positive electrode, a second functional layer, and a rechargeable lithium cell were fabricated by the same procedure as in Example 1, except that the mixing ratio of polyimide and polyvinylidene fluoride (PVdF) was 1:9 in the first functional layer preparation.

Comparative Example 2

A negative electrode, a first functional layer, a positive electrode, a second functional layer, and a rechargeable lithium cell were fabricated by the same procedure as in Example 1, except that the mixing ratio of polyimide and polyvinylidene fluoride (PVdF) was 9:1 in the first functional layer preparation.

Experimental Example 1—SEM Photograph

SEM photographs of the surface of the first functional layer according to Examples 1 and 2 and Comparative Examples 1 and 2 were taken and the results are respectively shown in FIG. 3 to FIG. 6.

Figure 3:
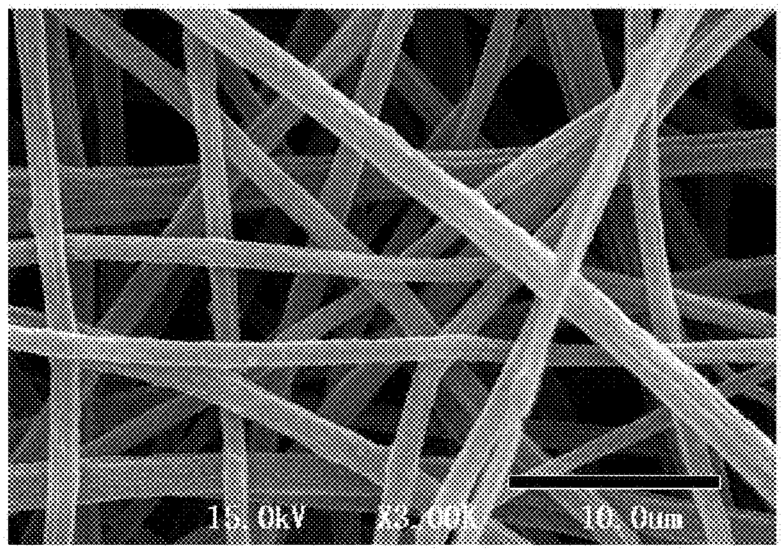
FIG. 3 is a SEM photograph of the first functional layer prepared according to Example 1.
Figure 4:
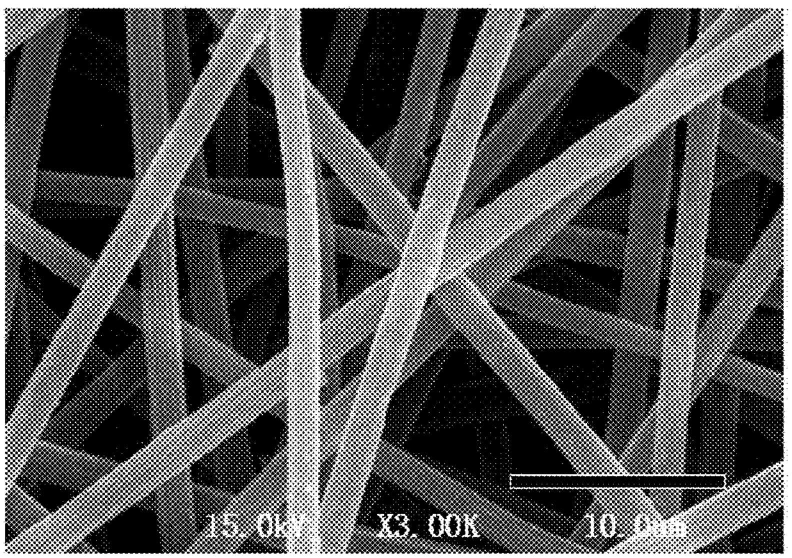
FIG. 4 is a SEM photograph of the first functional layer prepared according to Example 2.

Referring to FIG. 3 and FIG. 4, it can be evident that single fibers were formed the network structure on the surface of the first functional layer of Examples 1 and 2.

Figure 5:
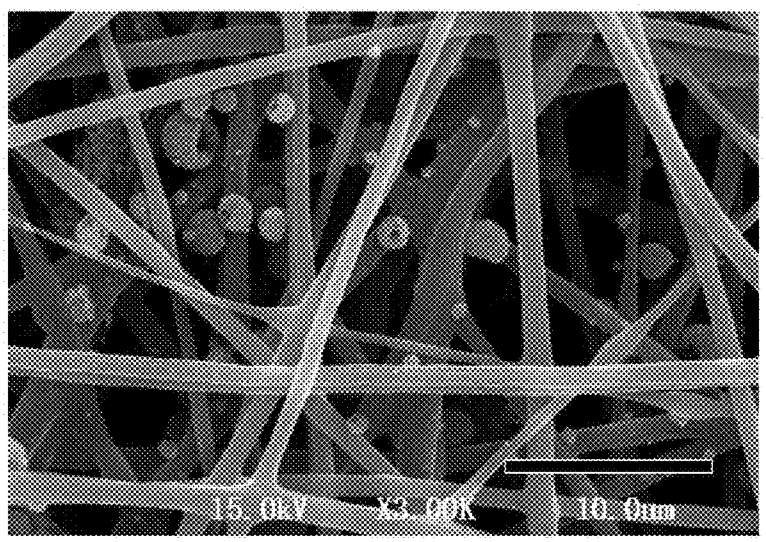
FIG. 5 is SEM photograph of the first functional layer prepared according to Comparative Example 1.
Figure 6:
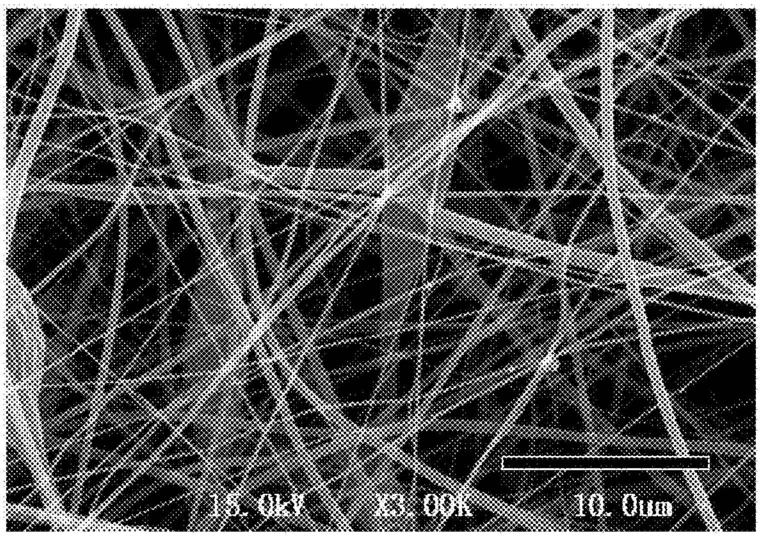
FIG. 6 is SEM photograph of the first functional layer prepared according to Comparative Example 2.

However, referring to FIG. 5, it can be seen that a plurality of beads was formed on the surface of the first functional layer according to Comparative Example 1. It can be seen from FIG. 6 that, on the surface of the first functional layer according to Comparative Example 2, two or more fibers were formed. In this case, the ion mobility was decreased on the portion in which the beads were formed, and thus, the performance of the rechargeable lithium cell was deteriorated. Furthermore, shortcomings such as pinhole generation occurred during the cell fabrication.

Examples 3 to 6

A negative electrode and a first functional layer were fabricated by the same procedure as in Example 2, except that the first functional layers had thicknesses of 4 μm, 6 μm, 8 μm and 10 μm, respectively.

Comparative Examples 3 to 6

In (1) of Example 1, a ceramic and an acryl-based binder were mixed at a weight ratio of 96:4 instead of PI and PVdF, and they were coated using gravure coating to prepare a negative electrode and a first functional layer.

In Comparative Examples 3, 4, 5, and 6, the first functional layers according to Comparative Examples 3, 4, 5, and 6 were prepared to have thicknesses of 4 μm, 6 μm, 8 μm, and 10 μm, respectively.

Experimental Example 2—Electrode Resistance Measurement

The negative electrodes on which the first functional layer was formed according to Examples 3 to 6 and Comparative Examples 3 to 6 was cut to a predetermined size (32 phi (φ)).

Resistance of the cut negative electrode was measured using LCR meter of a 4294A model available from Agilent Technologies, and it was converted to the specific resistance. The results are shown in Table 1.

TABLE 1

| Division | Electrode resistance (Ω · m) |
|---|---|
| Example 3 | 0.62 |
| Example 4 | 0.59 |
| Example 5 | 1.52 |
| Example 6 | 1.93 |
| Comparative Example 3 | 15.23 |
| Comparative Example 4 | 659.71 |
| Comparative Example 5 | 38019.24 |
| Comparative Example 6 | 50591.424 |

Referring to Table 1, it can be seen that the negative electrodes according to Examples 3 to 6 in which the first functional layer using polyimide and polyvinylidene fluoride mixed at a desirable mixing ratio was formed with a predetermined thickness, exhibited very low electrode specific resistance of 2 or less. Otherwise, the negative electrode according to Comparative Examples 3 to 6 in which the functional layer including ceramics was formed, as with the conventional technique, exhibited extremely higher electrode specific resistance, compared with the examples.

Accordingly, when the negative electrode formed with the first functional layer according to the exemplary embodiments is used as the negative electrode for the rechargeable lithium battery, the electrode specific resistance may be surprisingly decreased.

Comparative Example 7

A rechargeable cell was fabricated by the same procedure as in Example 1, except that a first functional layer and a second functional layer were not formed during the negative electrode and the positive electrode preparations.

Comparative Example 8

A rechargeable cell was fabricated by the same procedure as in Example 1, except that a first functional layer was not formed during the negative electrode preparation.

Comparative Example 9

A rechargeable cell was fabricated by the same procedure as in Example 1, except that a second functional layer was not formed during the positive electrode preparation.

Experimental Example 3—Penetration Test

Each of eight rechargeable cells according to Example 6 and Comparative Examples 7 to 9 was fully charged to 4.2 V. Next, a nail with a diameter of 2.5 mm and made of iron (Fe) was penetrated to the central of the rechargeable cells using a penetration tester and a penetration test was performed. Herein, the penetration speed was uniformly 10 m/min.

The measured results after the penetration test are shown in Table 2.

TABLE 2

| Division | No Event | Flame | Explosion | Total | Improvement % |
|---|---|---|---|---|---|
| Comparative Example 7 | 0 | 0 | 8 | 8 | 0% |
| Comparative Example 8 | 0 | 2 | 6 | 8 | 0% |
| Comparative Example 9 | 1 | 4 | 3 | 8 | 12.5% |
| Example 6 | 3 | 2 | 3 | 8 | 37.5% |

Referring Table 2, it can be seen that the rechargeable lithium cell according to Example 6 had 3 cells of 8 cells which were not exploded and had an improvement rate of 37.5%, but the rechargeable lithium cells according to Comparative Examples 7 to 9 were mostly exploded. Accordingly, the electrode assembly according to the examples exhibited excellent safety.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. An electrode assembly comprising:

a negative electrode;

a positive electrode;

a separator disposed between the negative electrode and the positive electrode, the separator including a first surface and a second surface, the second surface being opposite the first surface, the first surface facing the negative electrode and the second surface facing the positive electrode;

a first functional layer disposed directly on the first surface of the separator and including a fibrous polymer and a heat resistant polymer; and a second functional layer disposed directly on the second surface of the separator and including inorganic particles and organic particles, wherein the inorganic particles include at least one selected from the group consisting of a lithium manganese-based oxide and a lithium iron phosphate-based oxide, and wherein the first functional layer is separated from the second functional layer by the separator.

2. The electrode assembly of claim 1, wherein a thickness of the first functional layer is about 1 μm to about 12 μm.

3. The electrode assembly of claim 1, wherein the first functional layer has a network structure crosslinked by spinning or co-spinning.

4. The electrode assembly of claim 1, wherein the first functional layer has permeability of about 60% to about 80%.

5. The electrode assembly of claim 1, wherein the fibrous polymer includes at least one selected from the group consisting of a polystyrene, a polyvinyl chloride, and a polyethylene terephthalate.

6. The electrode assembly of claim 1, wherein the heat resistant polymer includes at least one selected from the group consisting of a polytetrafluoroethylene, a polyetheretherketone, and a polyphenylene sulfide.

7. The electrode assembly of claim 1, wherein a thickness of the second functional layer is about 2 μm to about 15 μm.

8. The electrode assembly of claim 1, wherein the organic particles include a polyethylene wax.

9. The electrode assembly of claim 1, wherein an average particle diameter of the organic particles is about 0.5 μm to about 2 μm.

10. The electrode assembly of claim 1, wherein an amount of the organic particles is about 5 wt % to about 60 wt % based on the second functional layer.

11. The electrode assembly of claim 1, wherein the separator includes a substrate comprising at least one of a polyethylene, a polybutylene, a polypentene, a polytetrafluoroethylene, a polyester, a polyacetal, a polyamide, a polycarbonate, a polyetheretherketone, a polyphenylene oxide, a polyphenylene sulfide, and a polyethylene naphthalate, or a coated substrate with a coating layer thereon.

12. A rechargeable battery comprising:

the electrode assembly of claim 1; and an outer case housing the electrode assembly.

13. The electrode assembly of claim 1, wherein the first functional layer consists of the fibrous polymer and the heat resistant polymer, the fibrous polymer is selected from the group consisting of polyethylene (PE), polypropylene (PP), polymethylmethacrylate (PMMA), polyvinylidene fluoride (PVdF), polyvinyl pyrrolidone (PVP), polysulfone (PSF), polystyrene (PS), polyvinylchloride (PVC), and polyethylene terephthalate (PET), and the heat resistant polymer is selected from the group consisting of polyimide (PI), polyvinyl alcohol (PVA), polyacrylonitrile (PAN), polytetrafluoroethylene (PTFE), polyamide-imide (PAI), polyetheretherketone (PEEK), polyether sulfone (PES), and polyphenylene sulfide (PPS).

14. The electrode assembly of claim 1, wherein a mixing weight ratio of the fibrous polymer and the heat resistant polymer is about 5:5 to about 2:8.

15. The electrode assembly of claim 1, wherein the first functional layer is directly on the first surface of the separator, and the second functional layer is directly on the second surface of the separator.

16. The electrode assembly of claim 1, wherein the positive electrode comprises a mixture of a first nickel-based positive active material and a second nickel-based positive active material.

* * * * *